United States Patent [19]

Barnes et al.

[11] 4,349,168

[45] Sep. 14, 1982

[54] CARGO DELIVERY SYSTEM FOR AIRCRAFT

[75] Inventors: Franklin K. Barnes, Redmond, Wash.; Eddie D. Banks, Higashai, Japan

[73] Assignee: The Boeing Company, Seattle, Wash.

[21] Appl. No.: 122,382

[22] Filed: Feb. 19, 1980

[51] Int. Cl.³ ............................ B64D 1/10; B64D 1/12
[52] U.S. Cl. .................................. 244/137 R; 410/79; 410/92; 410/105
[58] Field of Search ............ 244/118.1, 118.2, 137 R, 244/138 R; 410/79, 84, 85, 89, 92, 105

[56] References Cited

U.S. PATENT DOCUMENTS

| | | | |
|---|---|---|---|
| 3,182,608 | 5/1965 | Mollon | 244/137 R |
| 3,335,983 | 8/1967 | Mollon et al. | 244/137 R |
| 3,357,372 | 12/1967 | Bader | 244/137 R |
| 3,398,917 | 8/1968 | Grabe | 244/137 R |
| 3,424,410 | 1/1969 | Galaup | 244/137 R |
| 4,161,301 | 7/1979 | Beardsley | 244/137 R |
| 4,241,890 | 12/1980 | Pearson | 244/137 R |

*Primary Examiner*—Galen L. Barefoot
*Attorney, Agent, or Firm*—Ronald E. Suter; Bernard A. Donahue

[57] ABSTRACT

The system includes two parallel rails, multiple airdrop/logistics locks mounted by one rail, and multiple forward restraint mechanisms mounted by the other rail opposite alternate airdrop/logistics locks. Two drawbars are connected to and provide remote operation of the airdrop/logistics locks and the forward restraint mechanisms, respectively. The airdrop/logistics locks additionally are operable locally. Each airdrop/logistics lock includes a movable detent and a force responsive release assembly which releases the detent from an extended locking position upon attainment of a predetermined threshold force in the aft direction. The release assembly includes a fuse and a contractible cartridge assembly connected to the detent such that movement of the detent toward a release position will cause the cartridge to contact. The fuse is constituted by a longitudinally crushable honeycomb slug and has such load-deflection characteristics that it will crush a predetermined amount while maintaining a substantially constant resistance to further compression until attainment of a threshold force level. Each airdrop/logistics lock additionally includes an arming member which must be opened in order to permit its fuse to be crushed (for operation in an airdrop mode) and a locking member which blocks its fuse from being crushed (for operation in a logistics mode), even if the lock has been armed previously.

31 Claims, 31 Drawing Figures

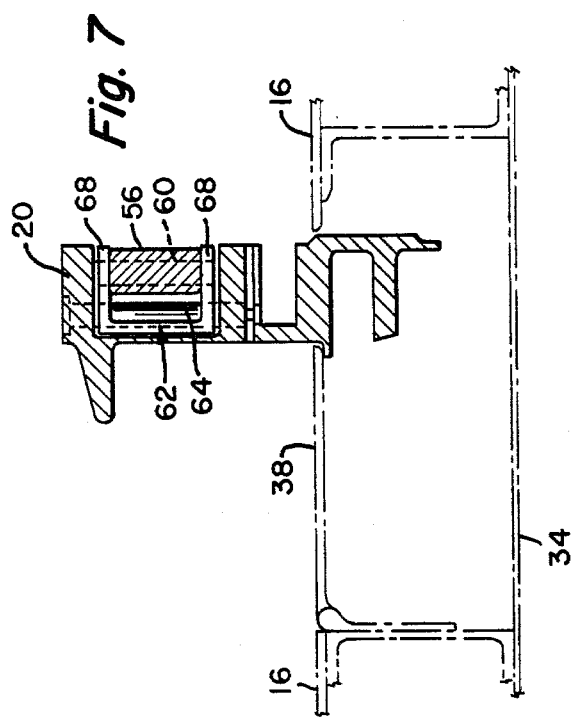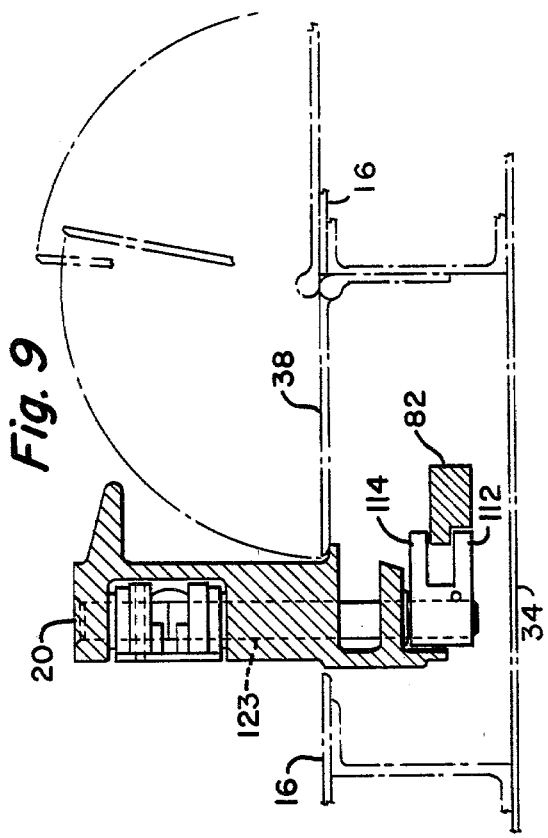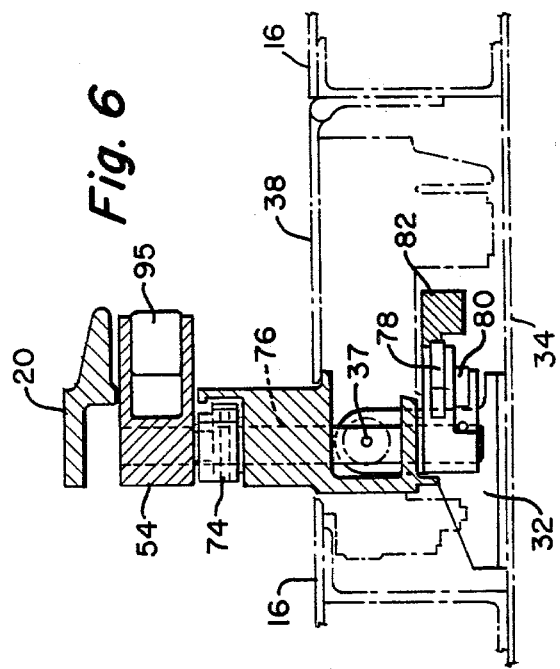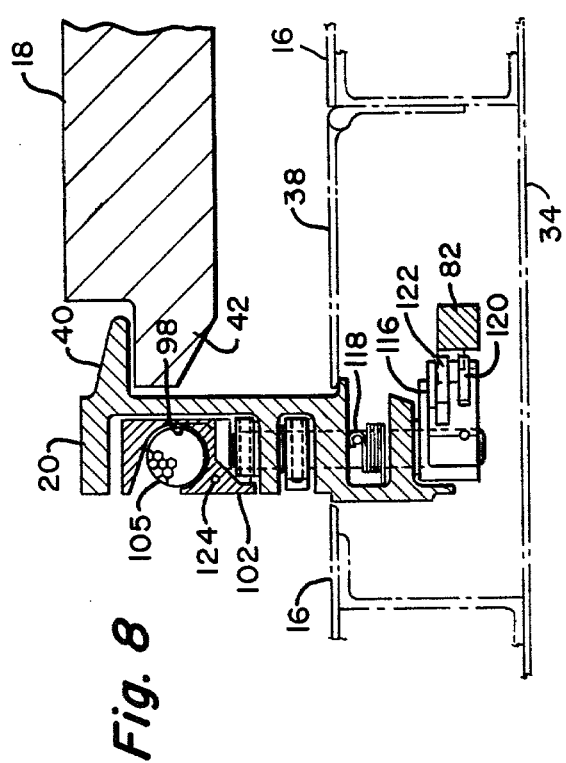

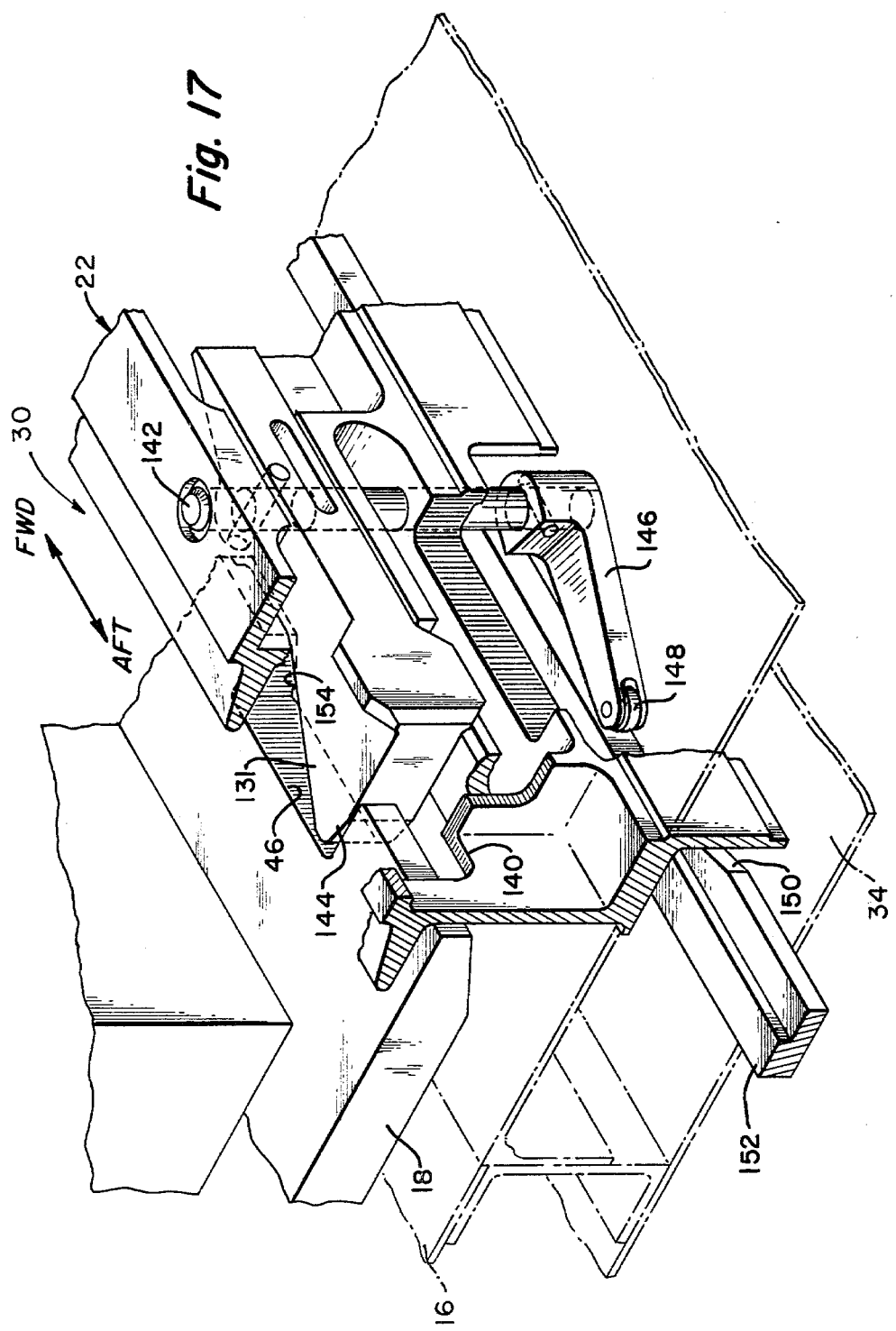

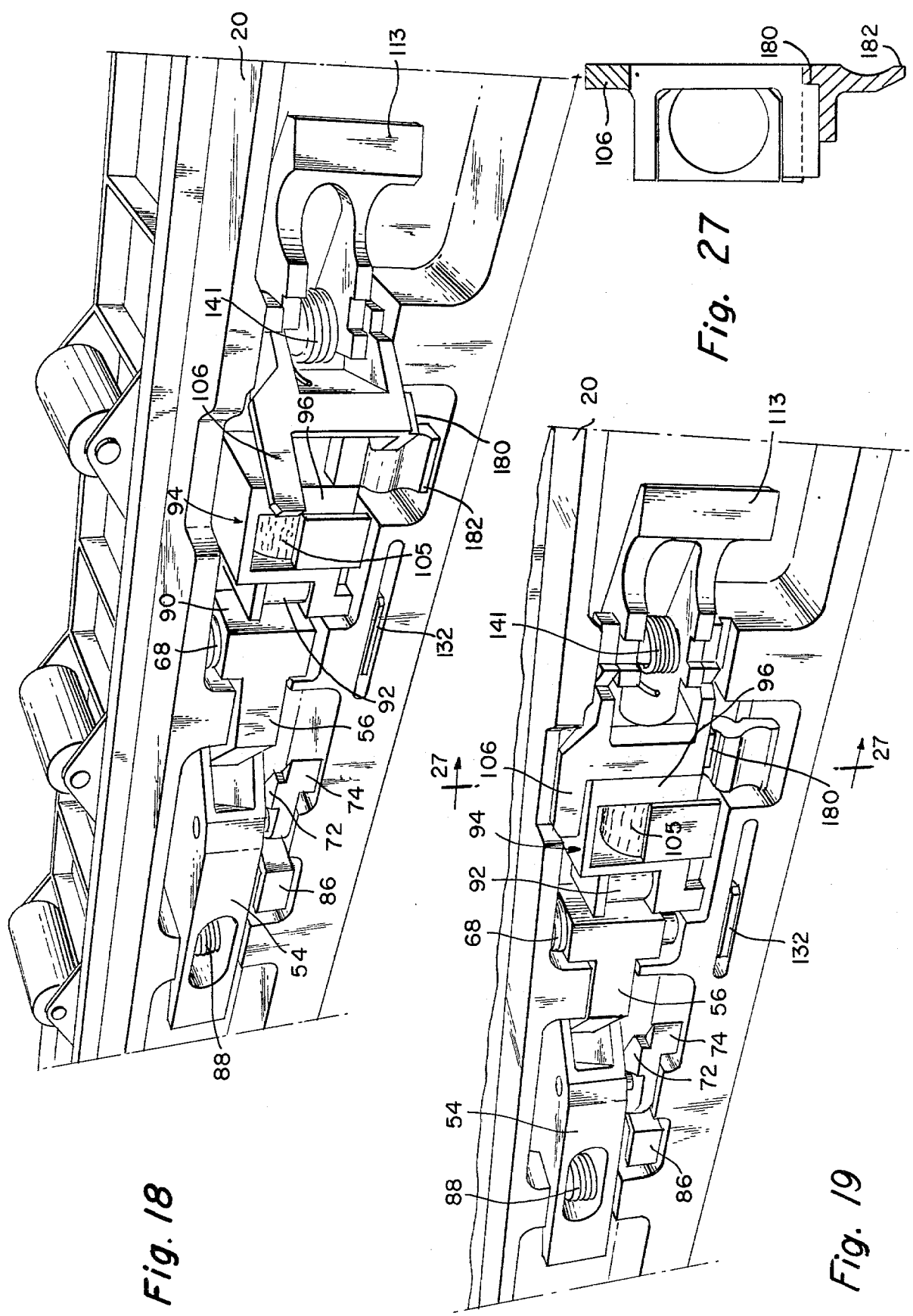

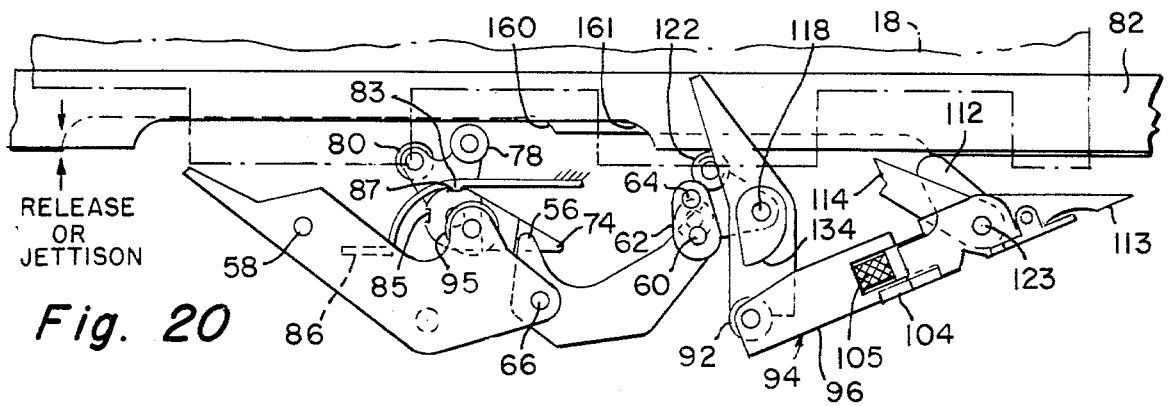
Fig. 20
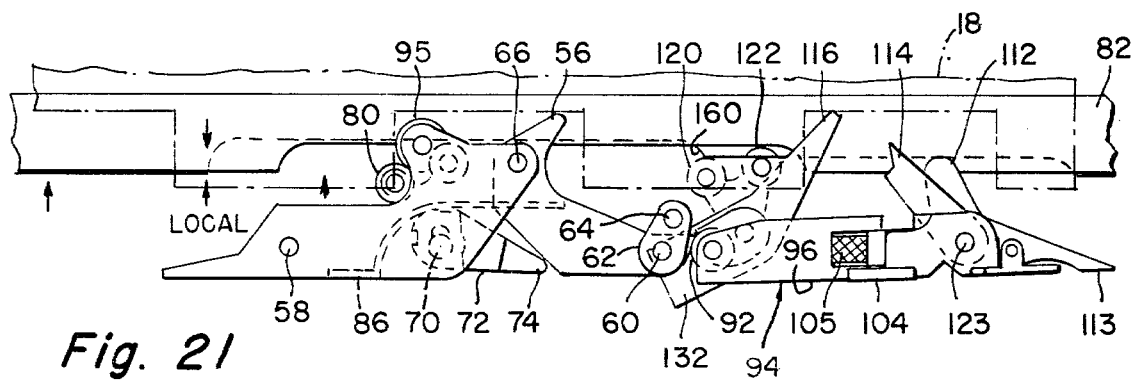
Fig. 21
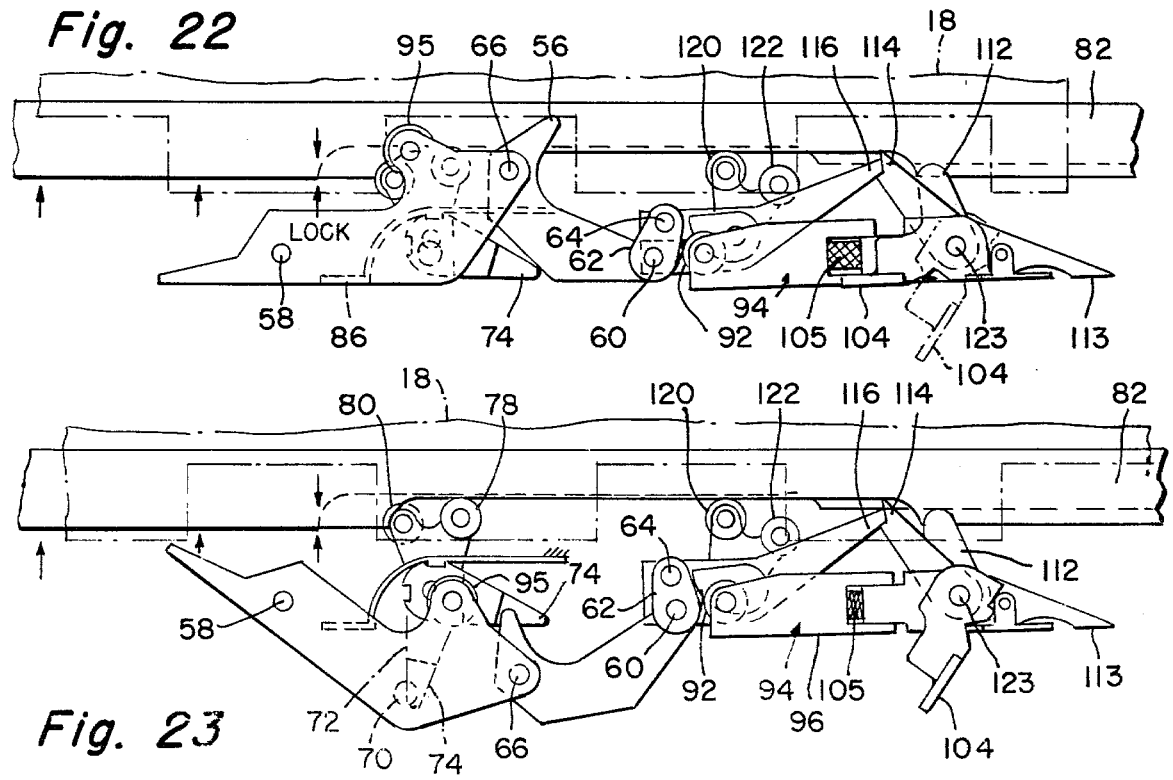
Fig. 22
Fig. 23

CARGO DELIVERY SYSTEM FOR AIRCRAFT

BACKGROUND OF THE INVENTION

This invention relates to aerial cargo delivery systems and to cargo restraint locks therefor.

Cargo drops by parachute from aircraft have been used extensively in military operations and disaster relief situations. In the usual parachute cargo delivery system, loaded cargo carriers, such as platforms or pallets, are guided for movement along the longitudinal axis of the aircraft between parallel rails secured to the aircraft floor. These pallets can be pulled backwardly out of the rear cargo receiving and delivery opening by a deployed parachute (i.e., the "airdrop mode"). During flight, they are restrained against forward and aft movement (i.e., the "logistics mode"). Desirably, such cargo planes also must be capable of loading or unloading cargo from or to trucks while on the ground and also must be capable of discharging cargo onto the ground as the aircraft accelerates over the ground surface (i.e., the "combat off-load mode"). Further, the capability must exist in such a system for in-flight jettison of pallets or platforms in emergency conditions.

In certain prior art aerial cargo delivery systems of this type, two spaces apart parallel restraint rails support and guide the cargo pallets or platforms for longitudinal movement within the aircraft. One rail is provided with airdrop locks (i.e., those which permit only aft movement of a pallet under the force exerted by a deployed parachute) which provide positive forward restraint and force responsive aft restraint. In this type of system, the airdrop locks are armed and engaged with the pallets while the aircraft is on the ground. Separate logistics locks (i.e., those which prevent both forward and aft movement during normal flight conditions) are carried on the other rail and provide both forward and aft positive restraint. These locks also are engaged with the pallets while the aircraft is on the ground. In the airdrop mode, the logistic locks are all disengaged while the aircraft is in-flight shortly before airdrop, leaving the airdrop locks to provide all forward and aft restraint until the parachute force applied attains a predetermined level. At this time the airdrop locks simultaneously release all the pallets. If it is necessary to return to the logistically-locked position, the logistics locks must be manually reengaged. However, the pallets may shift slightly while the logistic locks are disengaged, resulting in a skewed condition of the pallets on the rails. This makes reengagement of the logistic locks very difficult due to slot misalignment.

The airdrop locks typically used in the system described include a spring release which is tripped at a predetermined force threshold in response to application of a predetermined parachute force in order to release the airdrop locks, when in the airdrop mode. For multiple pallet airdrops, this force is distributed over and shared by multiple airdrop locks which are engaged, respectively, with indents formed in the cargo pallets. Since the pallets commonly include two or three indents which are engaged with separate airdrop locks, the force must be shared essentially equally among all the locks engaged with each pallet to ensure a predictable lock release sequence. Accordingly, the threshold release level of each airdrop lock is based upon equal distribution of aft forces among the airdrop locks. In many practical cases, however, such a force distribution is not attainable because of irregular indent spacing or pallet misalignment. As a consequence, one lock may be positively engaged with a pallet indent, while others intended for engagement with the same pallet are not. This one lock therefore bears a disproportionate share of the aft force applied. Since the spring or fuse release trips at a precise threshold release, this airdrop lock tends to release prematurely, even due to dynamic forces which appear during flight prior to airdrop. This is commonly referred to as "zippering."

A cargo handling system which combines the logistics and airdrop lock functions in a single rail is disclosed in application Ser. No. 961,359, filed Nov. 16, 1978 now abandoned and continuation Ser. No. 092,146 filed Nov. 7, 1979, now U.S. Pat. No. 4,241,890; issued Dec. 30, 1980, by R. E. Pearson, and assigned to the assignee of the present invention. This system therefore provides versatility and economies which surpass systems of the type described above. However, the use of deformable metallic fuses as the force threshold elements may tend to encourage "zippering" in some instances. Further, the foldable rails, although sectional, must all be in their upright positions for operation of the locks by a sectional drawbar carried by the rail sections. Consequently, the aircraft equipped with this system is incapable of carrying both palletized and non-palletized cargo at the same time. Finally, as in the system of the type described above, this system releases all pallets simultaneously when operated in the airdrop mode. It therefore lacks the ability to drop one or more pallets from a group of pallets at selected times during, for example, multiple pass airdrops.

SUMMARY OF THE INVENTION

This invention provides an aerial cargo delivery system which includes two parallel cargo support rails, but carries combination airdrop/logistics locks in only one rail. These locks are capable of sharing pallet applied loads on an essentially equal basis when engaged with a common multiple indent cargo carrier, whether a pallet or platform, without premature tripping, and are less susceptible to the effects of indent spacing variances or misalignment than airdrop locks heretofore available. These locks are armed locally for airdrop mode operation and are disarmed, either locally or remotely, for return to logistics mode operation (i.e., to reinstate positive aft restraint). Additionally, these locks may be armed independently for airdrop so that pallets may be airdropped selectively one at a time or in groups, depending upon the selection and sequencing of lock arming. The system further includes forward restraint mechanisms mounted by the other rail to provide forward restraint but no aft restraint when the opposite airdrop/logistics locks are disengaged. These mechanisms include restraint elements which can be retracted remotely to permit forward movement of the pallets during a loading operation.

According to one preferred embodiment of the invention, each airdrop/logistics lock includes a movable detent and a force responsive release assembly which releases the detent from an extended locking position upon attainment of a predetermined threshold force in the aft direction. The release assembly includes a fuse and a contractible cartridge assembly connected to the detent such that movement of the detent toward a release position will cause the cartridge to contract. When inserted into the cartridge, the fuse resists contraction of the cartridge as it is progressively deformed thereby.

The fuse has such load-deflection characteristics that it will deform a predetermined range while maintaining a substantially constant resistance to further deformation until attainment of a threshold force level. At this point, the cartridge will be contracted sufficiently to permit release of the detent. The detent is engageable with an indent formed in a cargo carrier, such as a pallet or platform, which is subject to an aft force applied by a parachute deployed behind a moving aircraft. It is this aft force which, when transmitted via the detent to the cartridge, causes the fuse to be deformed. Each airdrop/logistics lock additionally includes an arming member which must be opened in order to permit its fuse to be deformed (for operation in an airdrop mode) and a locking member which blocks its fuse from being deformed (for operation in a logistics mode), even if the lock has been armed previously. After airdrop, the deformed fuse is easily replaceable by a fresh fuse to prepare the system for a subsequent airdrop. While preferably the fuse is deformed compressively and is constituted by a crushable honeycomb slug, other types of fuses or force threshold responsive elements may be used.

When used with multiple indent cargo carriers, two or more such locks are engageable with respective indents of the same carrier. In this instance, if one lock is positively engaged with an indent while others are not, the locks mutually share applied aft forces by permitting limited aft shifting of the cargo carrier until all locks are positively engaged. The fuse associated with the one engaged lock is crushed to some extent as its cartridge contracts to permit partial movement of the associated detent in compliance with aft shifting of the cargo carrier before a parachute release or extraction force is applied. It is possible, however, by providing a fuse which is crushable to this extent within a selected range below an upper threshold deformation, to prevent premature release of the engaged detent. As a consequence, the locks tend to assume a condition in which they all share applied aft forces essentially equally and therefore release the cargo carrier in unison upon attainment of a predetermined release force applied by the deployed parachute. This force then appears proportionately at each lock as approximately the same threshold force level under airdrop release conditions.

It will be recognized that the partially crushed fuse will reach its threshold deformation, at which its detent will release, sooner than the other fuses, upon attainment of the parachute release force under airdrop conditions. Although this fuse may then allow its associated detent to release an instant before the other detents, the parachute release force builds to a threshold level so rapidly that the remaining fuses will reach their threshold deformations and release their detents essentially in unison. In most practical cases, therefore, no discernable time lag occurs between release of this detent and the remaining detents. It is particularly significant, however, that premature release of one detent due to disproportionate force distribution is nonetheless eliminated. Consequently, "zippering" tendences, especially in response to dynamic forces generated merely by motion of the aircraft, do not have an adverse effect on airdrop/logistics lock operation.

A single drawbar provides remote selection of airdrop/logistics lock operational modes, and individual lock and arming members associated with each lock provide local arming, disarming and lock-out operation as follows. In a first position of the drawbar, the locks are operable in the jettison or release mode wherein they are automatically disengaged. In a second position of the drawbar, all the locks are operable in a local mode, wherein they may be locked and unlocked manually, independently of each other. In a third poosition of the drawbar, the locks are operable in a lock mode, wherein their detents are maintained in their extended lock positions. In this mode, the locks cannot be disengaged manually; however, after locally arming each lock by opening the arming member, the cartridge associated with that lock is free to contract in response to application of an aft force to the associated detent. The fuse thus resists release of the detent as it is crushed by contraction of the cartridge until attainment of the threshold release force. It is this condition which exists during operation of the airdrop/logistics locks in the airdrop mode. Likewise, this condition persists prior to the airdrop mode, after the locks are armed, so that the pallets may shift in an aft direction a distance sufficient to achieve essentially equal force distribution among multiple locks engaged with common pallets, as described previously. Finally, the drawbar is movable to a fourth position in which all locks can be operated in a no-drop mode, wherein they are maintained in their locked positions (providing positive fore and aft restraint) regardless of whether they are armed for an airdrop. Each lock additionally includes a lock-out lever which, when moved manually to a lock-out position, maintains the lock detent in its extended lock position, as in the lock mode. This lever additionally is movable to a second position in which the detent is maintained in its retracted release position. In either position of the lock-out lever, the detent is blocked or held in this position and cannot be moved to its other position until the lock-out lever is returned to a neutral position. At this time, the drawbar may be used to control the lock as described above.

While preferably the rails are foldable into the cargo compartment floor and are of sectional construction, other rail constructions could be used. In the preferred rail construction, a single drawbar controls operation of the airdrop/logistics locks when the rail sections are unfolded in an upright position to accept cargo pallets. When the rail sections are folded in a stored position faired with the cargo compartment floor, the airdrop/logistics locks are disengaged from the drawbar. Thus, it is possible to fold down selected rail sections, so as to accept non-palletized cargo while other rail sections are unfolded to accept such cargo. The locks associated with the unfolded sections, of course, remain operational, either remotely or locally, as described above.

Thus it will be appreciated from the foregoing summary that this invention successfully minimizes or eliminates "zippering" or premature release tendencies. Additionally, it provides highly versatile yet reliable airdrop/logistics locks which surpass locks heretofore available for cargo aircraft applications. Likewise, this invention allows a single loadmaster to control a cargo loading, unloading, airdrop or jettison procedure and therefore yields substantial savings in personnel. With this invention, moreover, a cargo aircraft is capable of transporting and delivering both palletized and non-palletized cargo on a selective basis, one pallet at a time or in groups. This invention therefore yields additional operating economics which enhance the effectiveness of the cargo aircraft with which it is used.

The above and other objects and features of the invention will become apparent from the following detailed description taken in connection with the accompanying drawings which form a part of this specification, and in which:

BRIEF DESCRIPTION OF THE DRAWINGS

FIG. 6 is a cross-sectional view taken substantially along line VI—VI of FIG. 3;

FIG. 7 is a cross-sectional view taken substantially along line VII—VII of FIG. 3;

FIG. 8 is a cross-sectional view taken substantially along line VIII—VIII of FIG. 3;

FIG. 9 is a cross-sectional view taken substantially along line IX—IX of FIG. 3;

FIG. 17 is a perspective view of a forward restraint mechanism located opposite one airdrop/logistics lock of the invention;

FIGS. 18 and 19 are perspective views of a modified airdrop/logistic lock in its armed and disarmed positions, respectively;

FIGS. 20–24 are schematics depicting operation of the airdrop/logistics lock of this invention;

FIG. 27 is a sectional view taken along line 27—27 in FIG. 19.

DETAILED DESCRIPTION OF THE DRAWINGS

Figure 1A:
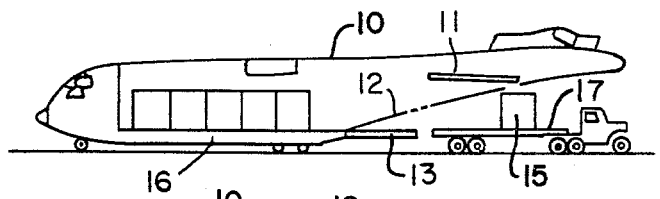
FIGS. 1A, 1B, 1C, 1D, and 1E illustrate various modes of operation of a cargo aircraft with which the present invention may be used.
Figure 1B:
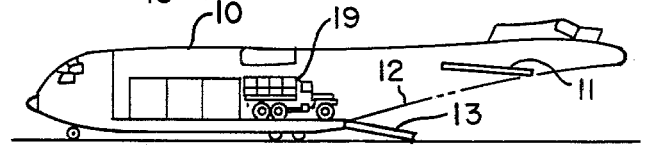
Figure 1C:
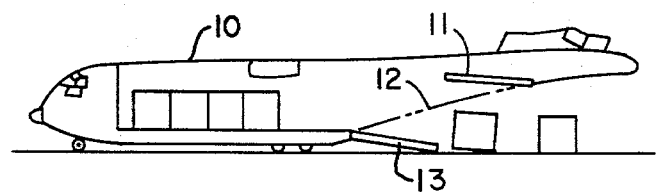
Figure 1D:
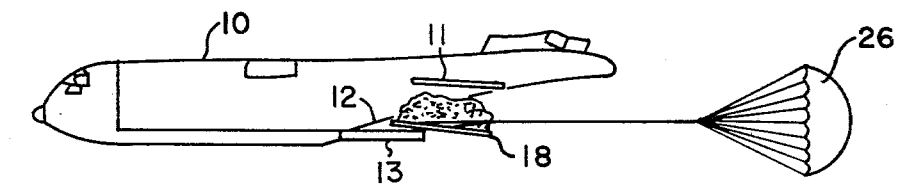
Figure 1E:
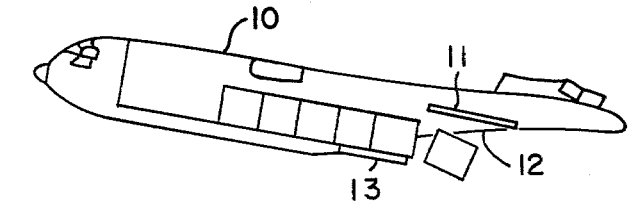
Figure 2:
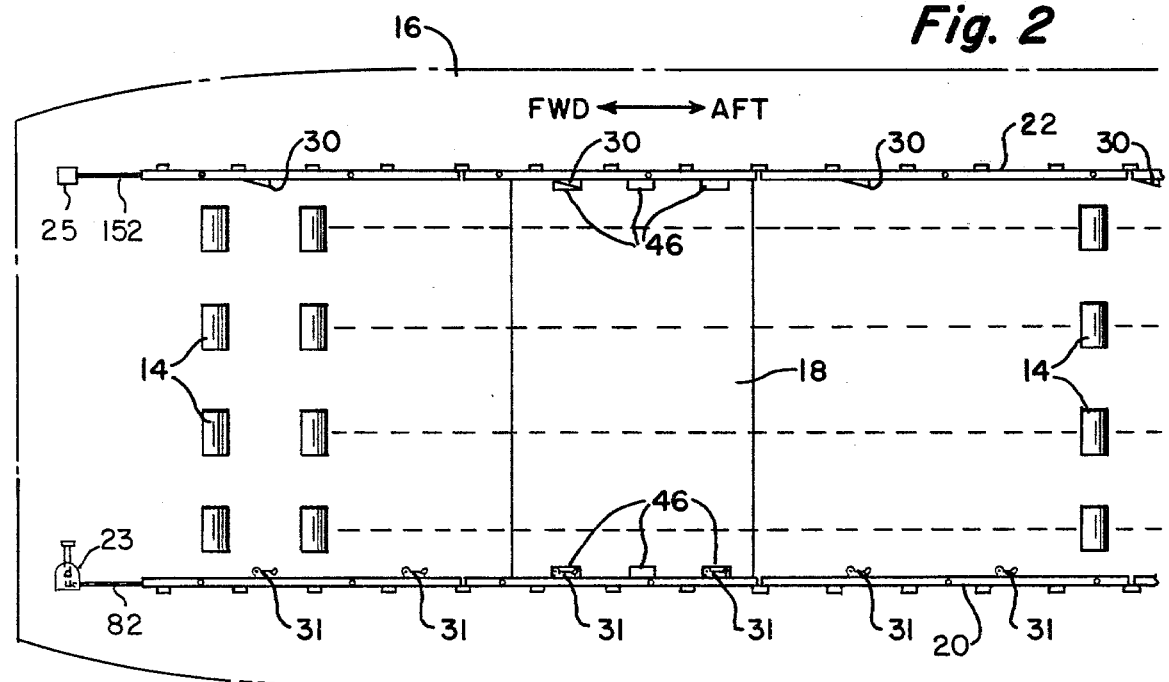
FIG. 2 is a top view of the pallet restraining rails used in the cargo aircraft of FIGS. 1A–1E and into which the locking system of the invention is incorporated.

With reference now to the drawings, and particularly to FIGS. 1A–1E and 2, there is shown a cargo aircraft 10 having in the aft portion of its underside a cargo receiving and delivery opening 12. Cargo is normally mounted on pallets which, in turn, are mounted on rollers 14 (FIG. 2) projecting upwardly from the aircraft floor 16. The pallets, one of which is shown in FIG. 2 and identified by the reference numeral 18, are guided for aft or forward movement between left and right sectional guide rails 20 and 22, hereinafter described in detail, and are provided on their opposite edges with indents or notches 46 into which forward restraint mechanisms 30 and locking device 31 are insertable, respectively, to engage and lock the pallet in a manner hereinafter described. Forward restraint mechanisms which include ratchet stops adapted to provide forward restraint only. Locking devices 31 are combination airdrop/logistics locks which provide both forward and aft restraint as described hereinafter. Load master control 23 is connected to and moves a left drawbar 82 reciprocatively parallel to rail 20. Drawbar 82 controls locks 31 as will be described presently. Actuator 25 likewise is connected to and moves right drawbar 152 which controls mechanism 30 as will be described presently.

Still referring to FIGS. 1A–1E, the opening 12 is closed during normal flight conditions by the upper and lower pivoted fuselage sections 11 and 13. That is, section 11 can be pivoted downwardly and section 13 pivoted upwardly into positions where their outer surfaces are flush with aircraft skin. When open, section 13 forms a ramp and is provided with rollers, similar to rollers 14, on which cargo can be pushed or extracted through the opening 12.

In FIG. 1A, the aircraft 10 is shown during normal loading or unloading of pallets. Cargo 15 on a truck 17, for example, is pushed on pallets onto the ramp 13. The pallets are then moved forwardly between the guide rails 20 and 22 shown in FIG. 2. During the unloading operation, the foregoing process is simply reversed.

In FIG. 1B, the aircraft is shown with a combined load of pallets and a vehicle 19. In this mode of operation, the rails and locks about to be described are operative over only the distance occupied by the pallets while the vehicle 19 is chained to the floor. Beneath the vehicle 19, the rails are folded into the floor to provide a smooth surface.

In FIG. 1C, the aircraft 10 is shown taxiing over the ground surface in what can be called a combat off-load operation. In this mode of operation, one, two or more, or all of the pallets are unlocked from the guide rails 20 and 22 such that they will move backwardly and down the ramp 13 onto the ground surface as the aircraft accelerates.

In FIG. 1D, the airdrop mode of operation is shown wherein a parachute 26 attached to a pallet 18 extends and pulls the pallet backwardly through a cargo receiving and delivery opening. In this mode of operation, the pallets are restrained against forward motion and are secured to the rails by the locks until the parachute opens, whereupon force responsive release assemblies permit the locks holding the pallets in position to automatically unlock.

In FIG. 1E, the aircraft 10 is in an inclined attitude with all pallets being jettisoned to relieve an in-flight emergency.

Referring to FIG. 2, forward restraint stops 30, hereinafter described in detail, are supported by rail 22 and are biased to engage right side indents 46 in the pallets 18. These stops are biased toward an extended locked position in the path of movement of pallets 10 in which they restrain forward movement of the pallets. They are retractable by drawbar 152 to permit forward movement of the pallets 18 during loading. During off-loading or during an airdrop, stops 30 ratchet inwardly and readily permit aft movement of the pallets. The purpose of stops 30 is to supplement locks 31 in a forward crash or stop condition. Additionally, they prevent sudden forward movement of a pallet if the aircraft is braked during the combat off-load mode (FIG. 1C) when the locks 31 are unlocked.

It will be apparent from FIG. 2 that there are twice the number of locks 31 on rail 20 as stops 30 on rail 22 and that the restraints are directly opposite every other lock. The indents 46 on opposite sides of each pallet 18 are aligned to receive the locks and the restraints. In the usual case, the number of indents is greater than the number of locks to permit pallets to be locked in position at various locations along the rails.

Figure 3:
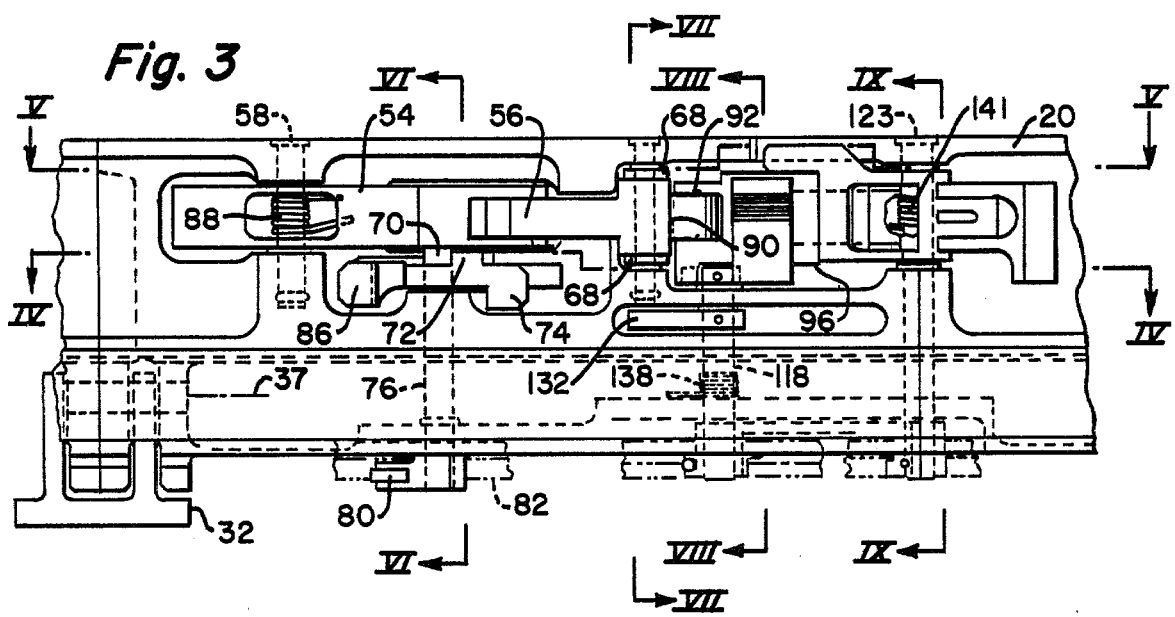
FIG. 3 is an elevational side view (as viewed from the outside of a restraining rail) of the airdrop/logistics lock of the invention.

Referring to FIGS. 3 and 6 rail 20 is mounted on hinges 32, carried on a plate 34 beneath the aircraft floor 16 and rotatable about an axis 37. In this regard, the rail 20 is rotatable from the full-line position shown in FIG. 6 to the broken-line or stowed position which is at right angles to the full-line position. In order to stow the rail beneath the floor of the aircraft, a hinge plate 38, forming part of the floor, is rotated upwardly and the complete rail assembly then rotated in a clockwise direction as viewed in FIG. 6 until it is in the broken-line or stowed position. Thereafter, the plate 38 is rotated downwardly into the closed position. (See also FIG. 9.) The rail 22 on the opposite side of the pallets is similar to that shown in FIGS. 6-9 except that it carries only the forward restraints 30, hereinafter described in detail. Each rail is provided with an upper inboard flange 40 (FIG. 8) which overlies flanges 42 which extend outboard of the pallets 18. The flanges 42, in turn, are provided with notches 46 (see FIGS. 2 and 5) into which the locking devices of the invention extend. When rails 20 and 22 are stowed, the locks 30 and 31 are disengaged from drawbars 152 and 82, respectively.

In a preferred rail construction such as that illustrated, a single drawbar 82 controls operation of locks 31 when the rail sections which make up rail 20 are unfolded in their upright positions to accept cargo pallets. When these rail sections are folded in their stowed positions faired with the cargo compartment floor, the locks 31, of course, are disengaged from the drawbar 82. Thus, it is possible to fold down selected rail sections so as to accept non-palletized cargo while other rail sections are unfolded to accept such cargo. The locks 31 associated with the unfolded sections, of course, remain operational, either remotely or locally, as will be described.

Figure 4:
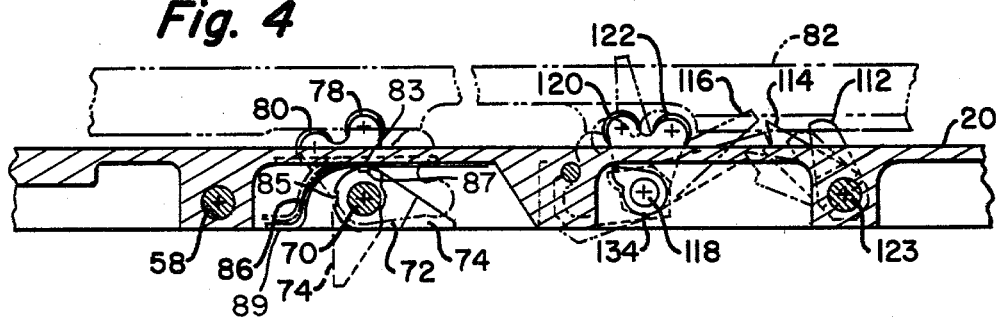
FIG. 4 is a cross-sectional view taken substantially along line IV—IV of FIG. 3.
Figure 5:
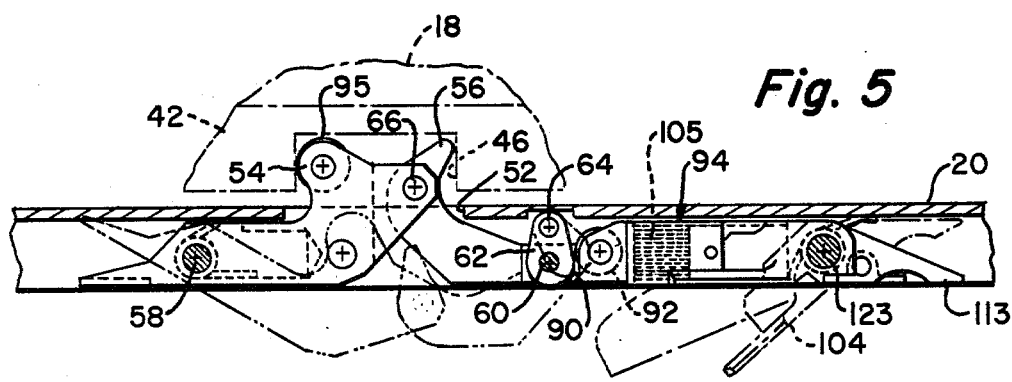
FIG. 5 is a cross-sectional view taken substantially along line V—V of FIG. 3.

With specific reference now to FIGS. 3-5, each lock comprises two locking members 54 and 56 which are insertable through an opening 52 (FIG. 5) in the rail 20. Each of the locking members 54 and 56 is generally L-shaped in configuration. Locking member 54 has its one end pivotally mounted on an upstanding pin 58 whose axis extends parallel to the plane of the opening 52. The corresponding end of the locking member 56 is pivotally mounted on a pin 60 (FIG. 5) carried on a linkage 62 which, in turn, has its other end pivotally mounted on an upstanding pin 64 mounted in the rail 20. The other or facing ends of the locking members 54 and 56 are pivotally connected as at 66 to form a scissors linkage. The locking members can be moved from the full-line position shown in FIG. 5, where they extend into an indent 46 in an associated pallet 18, to the broken-line positions shown where they are retracted from the indent 46 and the opening 52. As the locking members 54 and 56 move inwardly, they spread apart due to movement of member 56 with respect to member 54. Such movement is facilitated by the linkage 62 which has upper and lower clevis elements 68 (FIGS. 3 and 7) through which the pins 60, 64 extend. A roller 95 is supported from the inboard end of member 54, as shown (FIGS. 5 and 6). This roller reduces friction between the pallet indent and the lock when the members 54 and 56 are withdrawn from the indent during an airdrop release.

Figure 24:
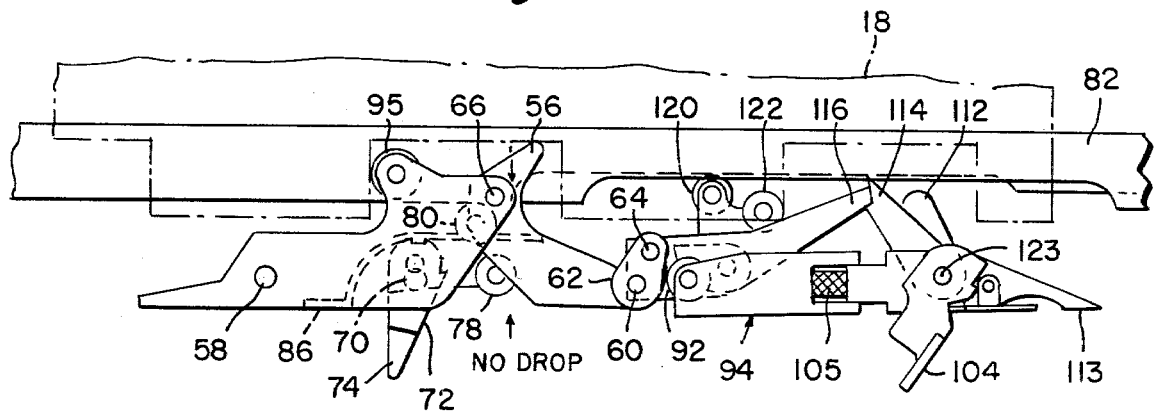

Depending downwardly from the lower surface of the locking member 54 is a short pin 70 (FIGS. 3 and 4). The pin 70, in turn, is adapted to be engaged and blocked by an upstanding portion 72 of a lock-out member or arm 74 when it is rotated into the broken-line position shown in FIG. 4 (i.e., where it projects outwardly from the outboard side of the rail 20). The member 74, in turn, is carried on a shaft 76 (see also FIG. 6) which carries at its lower end upper and lower cam followers 78 and 80 adapted to engage cooperating cam surfaces on a control drawbar 82 reciprocable along the lower side of the rail 20. As depicted in FIGS. 23 and 24, portion 72 blocks pin 70 at either the retracted position (FIG. 23) or the locked position (FIG. 24) of the locking members.

Assuming that the cam followers 78 and 80 do not engage cam surfaces on the drawbar 82, the lock-out member 74 can be rotated into the broken-line blocking position shown in FIG. 4 manually (i.e., with the fingers of a member of the aircraft crew). It is provided with notches 83 and 85 on its rounded periphery adapted to engage a detent carried on a leaf spring 86 which, in turn, is mounted on the side of the rail 20. Notch 83 is engaged with detent 87 at the neutral position of member 74 depicted in solid lines in FIG. 4. Notch 85 is engaged with detent 87 at the blocking position of member 74, depicted in broken lines in FIG. 4. When engaged with notches 83 or 85, detent 87 maintains member 74 in the two positions illustrated. To move member 74 out of one of these positions, an externally accessible pressure plate 89 (FIG. 4) is depressed toward rail 20, so as to disengage detent 87 from notch 83 or 85. Alternatively, member 74 can be moved to its blocking position by engagement of the cam followers 78 and 80 with cam surfaces on the drawbar 82 in a manner hereinafter described.

The lockding members 54 and 56 are normally urged into their retracted position depicted by broken-line in FIG. 5 (i.e., member 54 is urged to rotate in a clockwise direction) by coil spring 88 (FIG. 3) which surrounds the upstanding pin 58. However, when the locking members are kicked into the locking or full-line positions shown in FIG. 5, a cam surface 90 on the right end of the locking member 56 will engage a roller 92 on a pressure responsive release assembly 94, about to be described, which prevents outboard movement of the members 54 and 56 toward their retracted release position until attainment of a predetermined threshold release force.

Figure 10:
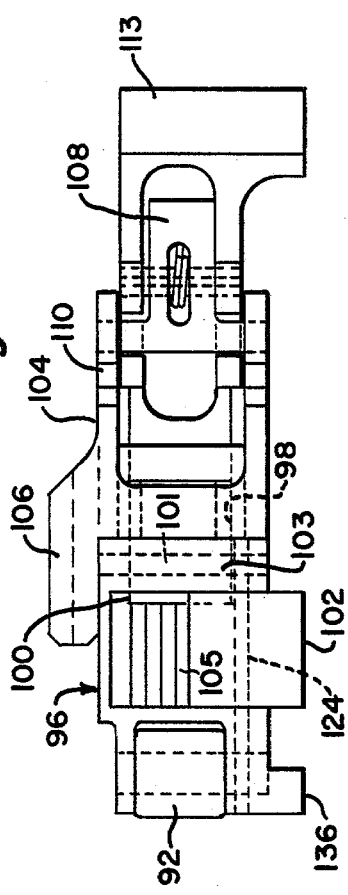
FIG. 10 is an elevational side view of the force responsive release assembly of the invention.
Figure 11:
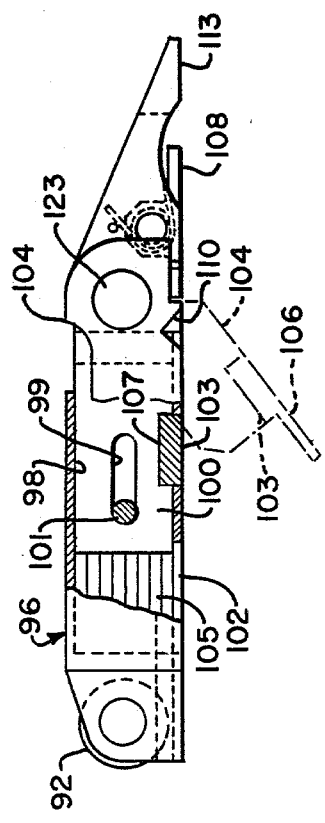
FIG. 11 is a top view of the assembly of FIG. 10.

The details of assembly 94 are shown in FIGS. 10 and 11. It includes a contractible cartridge made up of a body 96 having a cylindrical bore 98 which slides over a piston 100. The piston 100, in turn, is secured to a rotatable shaft 123 extending upwardly through the rail 20. Formed in the piston 100 is a longitudinal slot 99 which receives a pin 101 to keep the piston from rotating. A fuse-holder assembly 102 supports piston 100 and is supported for pivotal movement by pivot pin 124 extending through body 96. The fuse holder 102 can be pivoted in a counterclockwise direction as viewed in FIG. 8 to receive a cylindrical fuse 105. The fuse holder 102 is then rotated in a clockwise direction to move the fuse 105 into the position shown in FIG. 8 where it is between the end of the piston 100 and the end of bore 98. The piston 100 is provided with a vertically-extending channel 107 adapted to receive a vertically-extending portion 103 of an arming member 104 having a lever portion 106 which can be grasped by the loadmaster. With the vertically-extending member 103 in the channel 107 formed in the piston 100, the housing 96 cannot move to the right as viewed in FIGS. 10 and 11. However, when the member 104 is opened by outward rotation into the broken-line position shown in FIGS. 5 and 11, movement of the housing 96 over the piston 100 is no longer prevented. Consequently, the roller 92, under the force of the opening lock members 54 and 56, can move against the restraint afforded by honeycomb fuse 105 to crush the same. The member 104 is held in its closed position by means of a spring-loaded lever 108 which can be depressed by the thumb of the loadmaster to permit member 104 to rotate outwardly, whereupon the member 104 is held in the outward position by insertion of the left end of the lever 108 in notch 110 formed in member 104 as shown in FIG. 11. Assuming that the drawbar 82 is in proper position as described hereinafter, the entire fuse assembly 94 can also be rotated on shaft 123 into the broken-line position shown in FIG. 5 by pressing or kicking lever arm 113 shown in FIGS. 10 and 11.

Figure 12:
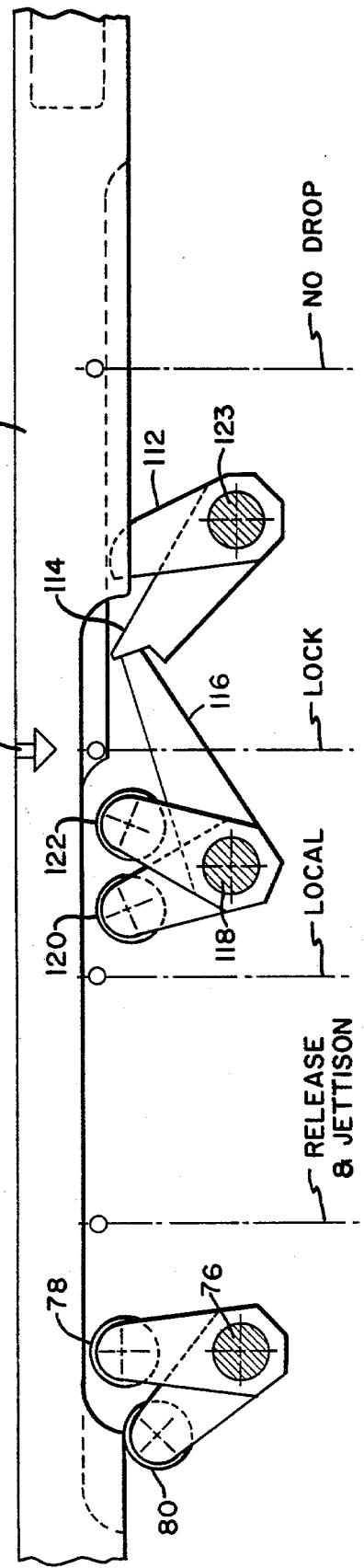
FIG. 12 is a schematic depicting the relationship between the actuating drawbar and various cam followers which actuate the airdrop/logistics lock mechanism of the invention.

As shown in FIGS. 4, 9 and 12, the shaft 123 carries at its lower end a pair of levers 112 and 114 movable from the solid-line position to the broken-line position shown in FIG. 4. The lever 112 is adapted to be engaged by a cam surface on the drawbar 82 (FIG. 12); while the notched end of lever 114 is adapted to engage a lever 116 secured to a vertical shaft 118 beneath the fuse assembly 94. As shown in FIGS. 4, 9 and 12, the shaft 118 carries at its lower extremity two cam followers 120 and 122, also adapted to engage cam surfaces on the drawbar 82. As will be appreciated, when the lever 114 is in contact with the lever 116, it is not possible to rotate the fuse assembly 94 into the broken-line position shown in FIG. 5.

Figure 25:
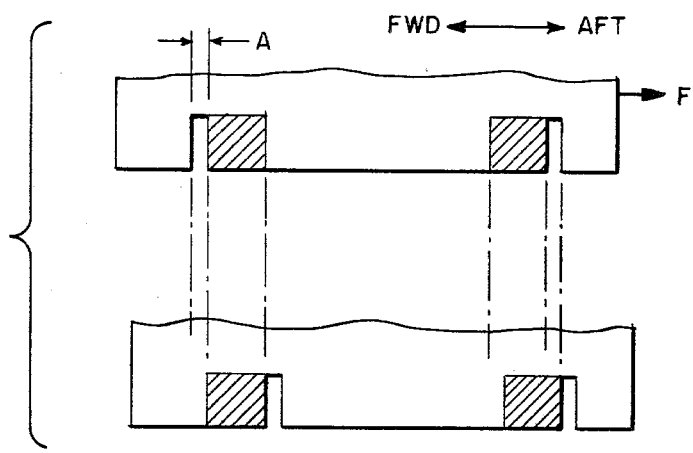
FIG. 25 is a schematic depicting aft shifting of a double indent pallet to achieve equal load distribution among two airdrop/logistics locks.
Figure 26:
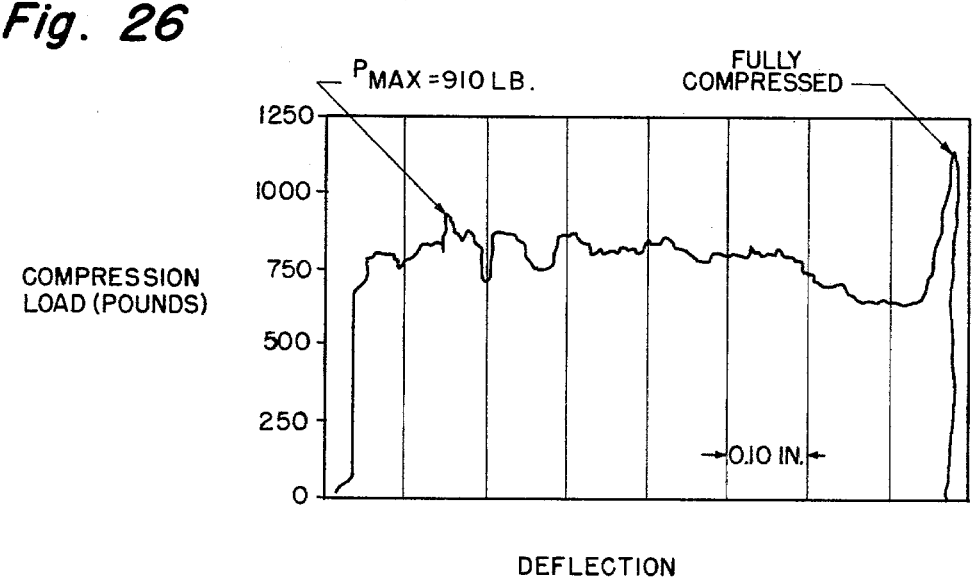
FIG. 26 is a typical graph of compression load versus deflection of a compressible fuse suitable for use in the airdrop/logistics lock of this invention.

Fuse 105 is composed of an axially collapsible honeycomb slug structure which includes parallel longitudinal cells. Preferably the slug is circular in cross-sectional outline and has cells of hexagonal cross-section, although other slug and cell cross-sections could be used. In the example, the cell is precrushed on one end an amount sufficient to yield a substantially constant force deflection curve, as illustrated in FIG. 26. When placed in axial compression between piston 100 and housing 96 as a result of force transmitted from the pallet via the locking members while engaged with indent 46, fuse 105 progressively collapses or crushes in a generally axial direction. However, its load bearing strength remains substantially constant over a predetermined distance sufficient to allow other locks engaged with the same pallet to accept a proportionate, preferably equal, share of the applied load. In the example, each fuse member should be capable of allowing aft longitudinal pallet shifting under these circumstances of at least about ⅛ inch, as depicted by distance A in FIG. 25. For an aerial delivery system in which the applied parachute release force is ½ g, as applied to pallets which require locking at two locations, the fuse member should be compressible a distance which yields lock release (i.e., a distance exceeding ⅛ inch) in response to application of a ¼ g force. This is obtainable by selecting the size and composition of the honeycomb slug, and other factors. With this construction, the locks 31 are self-compensating for pallet notch irregularities of the type described above and, as a result, the load distribution among the locks 31 engaged with the same pallet tends to be essentially equal. As a consequence, undesirable "zippering" effects do not tend to occur.

Figure 14:
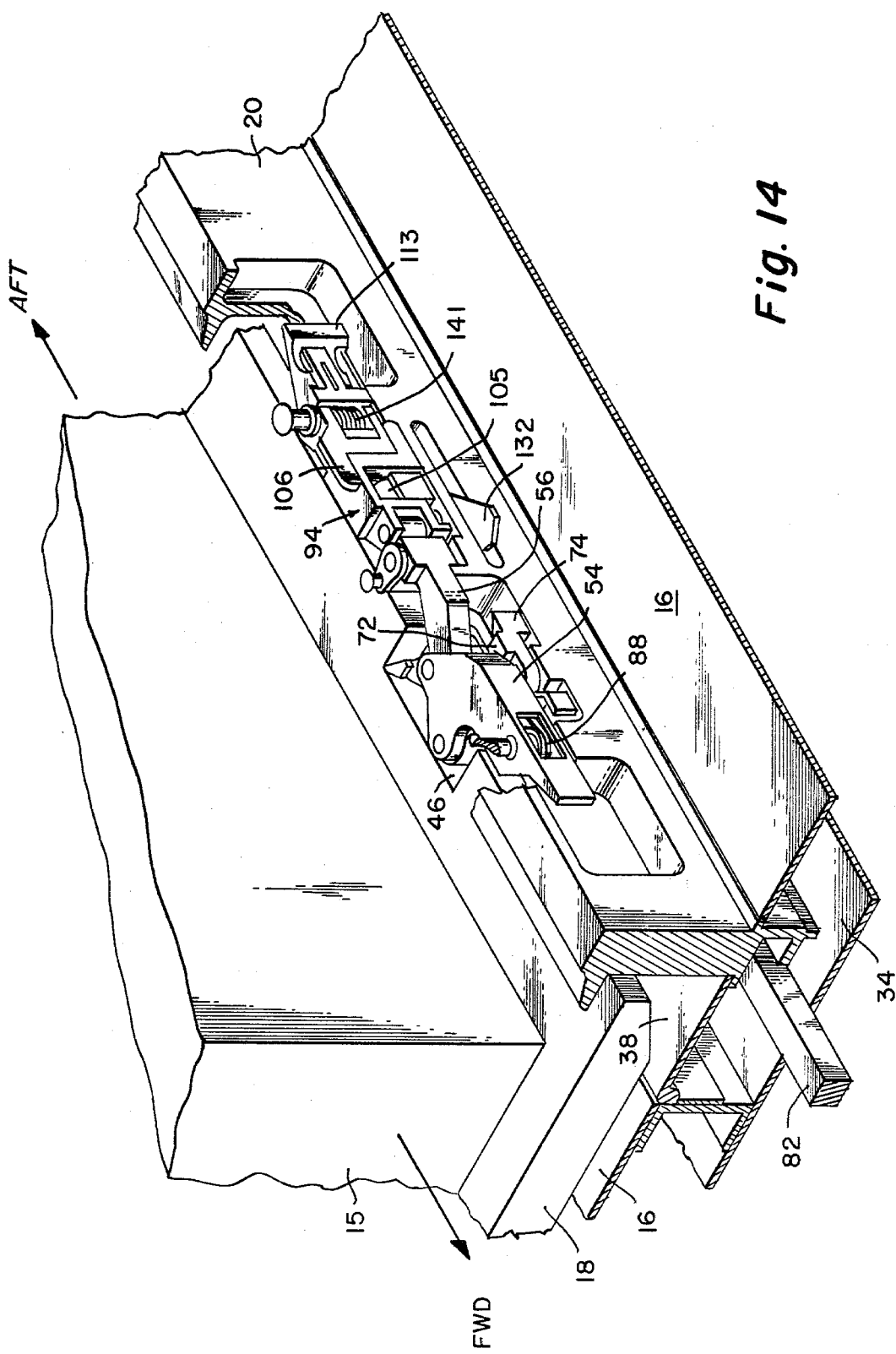
Figure 15:
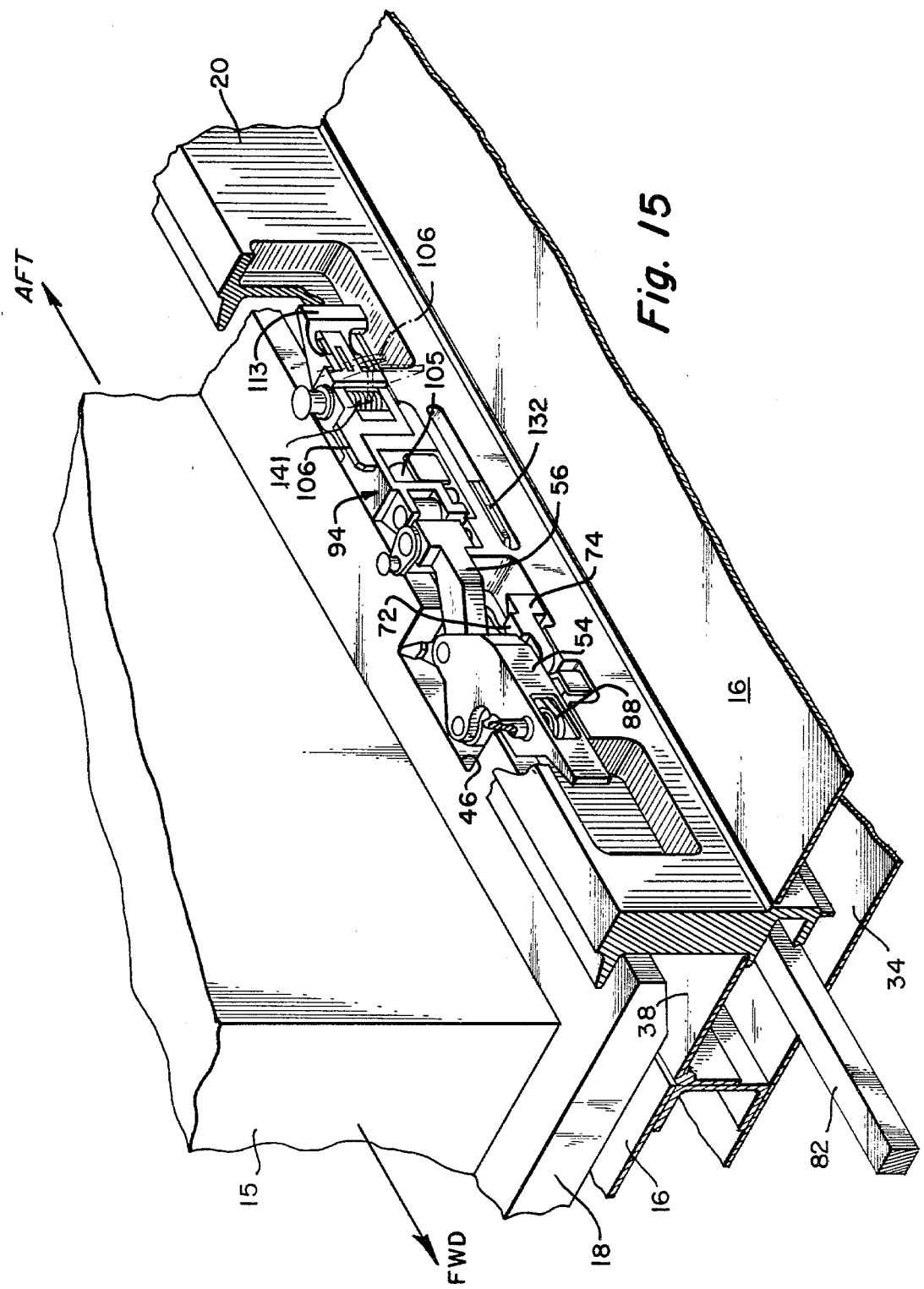

The operation of the system will now be described by reference to FIGS. 12-16 and 20-24. In FIG. 12, the drawbar 82 is shown in the locked position as indicated by the location of arrow 131 with respect to the corresponding location marked "LOCK". Under these circumstances, lever 114 is in engagement with lever 116 as depicted in FIG. 22 and shaft 123 cannot rotate in a counterclockwise direction. Consequently, the fuse assembly 94 cannot be rotated outwardly from the flush position shown in FIG. 15 by kicking or pushing against the lever arm 113. Assuming that arming member 104 is closed (i.e., it is not rotated outwardly) the fuse cartridge cannot contract due to sliding of housing 96 to the right over piston 100; roller 92 cannot move to the right either; and the locking members 54 and 56 are held in their extended locking positions. Under these circumstances, the lock remains engaged with indent 46 and the pallet 18 cannot move either forward or aft. The locking assembly then appears as shown in FIG. 15 and is flush with the outer surface of rail 20.

Now, if the lever 108 (FIGS. 10 and 11) is depressed to release member 104, and if member 104 is then opened by outward rotation into the broken-line position shown in FIG. 22, the vertically-extending portion 103 is no longer in the slot 107 in piston 100. As a result, housing 96 can move to the right to crush the fuse 105 against the end of piston 100, as depicted in FIG. 23. This will occur during the airdrop mode of operation shown in FIG. 1D; however, it will be appreciated that the loadmaster on the aircraft will have to "arm" each lock for pallets which are to be airdropped by manually opening member 104 on each lock assembly shortly before the airdrop. Once opened, member 104 acts as a flag to indicate to the loadmaster that that particular lock has been armed for an airdrop. One or all of the locks can be armed in this manner, depending upon the particular requirements of an airdrop. Unless the member 104 for a particular lock is opened, the locking members 54 and 56 remain in their locking positions and cannot be rotated outwardly under any circumstances as long as the drawbar 82 is in the position shown in FIG. 12.

It will now be assumed that the drawbar 82 is moved to the left such that the arrow 131 is adjacent the "LOCAL" location. As the drawbar is moved to the left, cam follower (or roller) 120 will engage a cam surface 161 on the drawbar, thereby causing shaft 118 and lever 116 to rotate in a counterclockwise direction and the lock assumes the positions illustrated in FIGS. 14 and 21. Rotation of lever 116 disengages it from lever 114 and causes a flag 132 on shaft 118 to be rotated outwardly as shown in FIG. 14. This signals the loadmaster that the lock can now be locally controlled. That is, when lever 113 is kicked or pressed, the entire fuse assembly 94 can be rotated outwardly into the position shown in FIG. 13, thereby causing the locking members 54 and 56 to rotate outwardly under the force of spring 88 and into the positions shown. The locking members can be re-engaged by pushing or kicking them inwardly. When this occurs, spring 141 (FIG. 3) rotates assembly 94 inwardly such that roller 92 engages cam surface 90 (FIG. 5) to hold the locking members in the locked positions shown in FIG. 14. If desired, the locking members can be held in locked position even if lever 113 is kicked inwardly by rotating the lock-out member 74 outwardly into the broken-line position shown in FIG. 4 where the curved surface on the upstanding portion 72 engages the pin 70 to hold the locking members 54 and 56 in locked position. Conversely, the locking members can be held in their retracted positions by manually rotating member 74 to this position, as depicted in FIG. 23.

Figure 13:
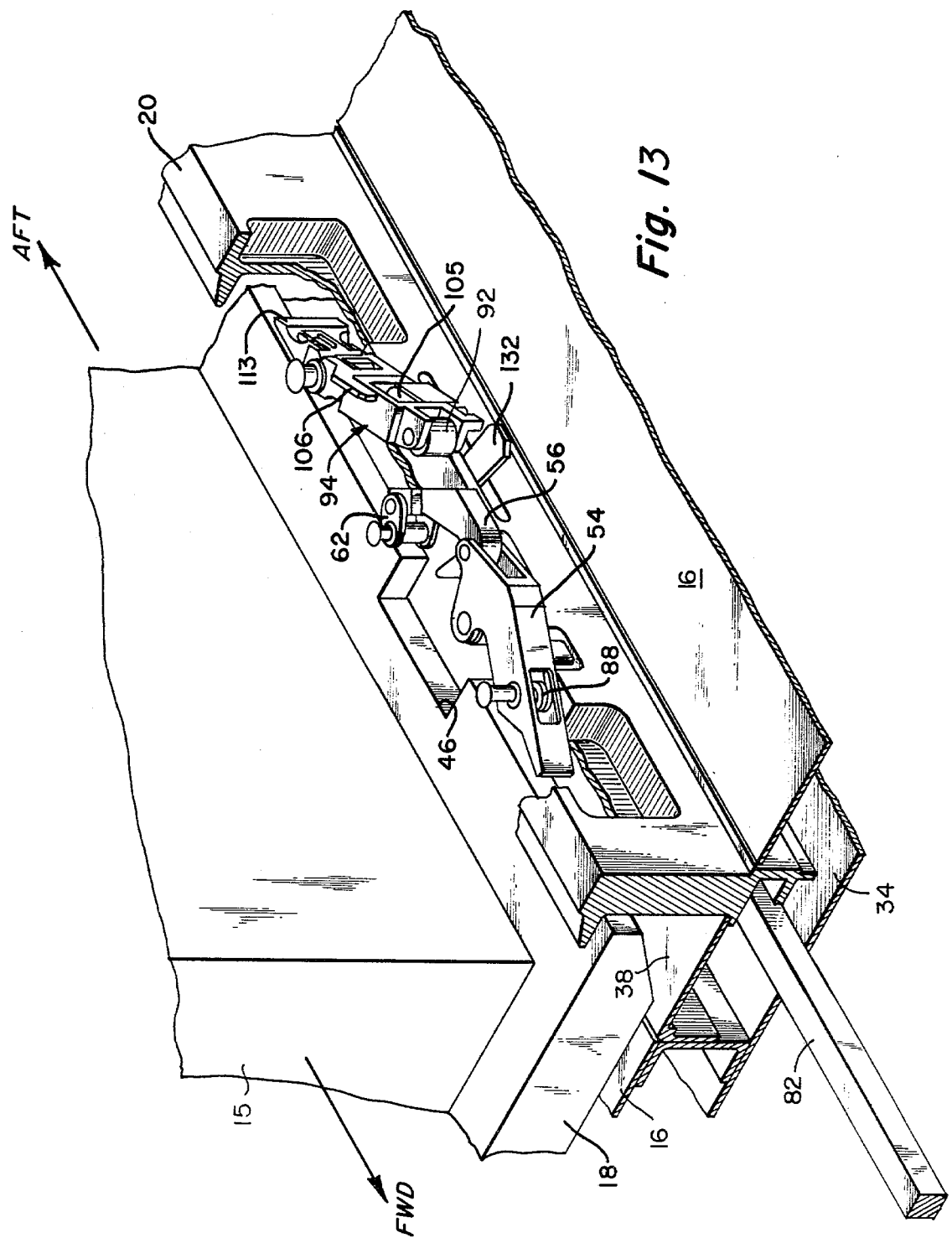
FIGS. 13–16 are perspective views of the airdrop/logistics lock of the invention in its release or jettison position, local position, lock position and no-drop position, respectively.

If it is necessary to jettison pallets (FIG. 1E), the drawbar 82 is pulled to its extreme leftward position where the arrow 131 is aligned with the notation "RELEASE AND JETTISON" in FIG. 12 and the lock assumes the position illustrated in FIGS. 13 and 20. As the drawbar 82 moves to its extreme leftward position, the cam follower 122 will engage a cam surface 161 on the drawbar (see FIGS. 20 and 21), causing the shaft 118 to rotate further in a counterclockwise direction. This causes a cam 134 to engage a tang 136 (FIG. 10) on the housing 96, thereby causing the housing 96 to rotate outwardly and out of engagement with the locking members 54 and 56 which now move outwardly under the force of spring 88. As will be appreciated, since the shaft 118 is clockwise-biased by spring 138 (FIG. 3), when the drawbar 82 is moved back to the LOCAL or LOCKED position, the shaft 118 will disengage the cam 134 from tang 136.

Figure 16:
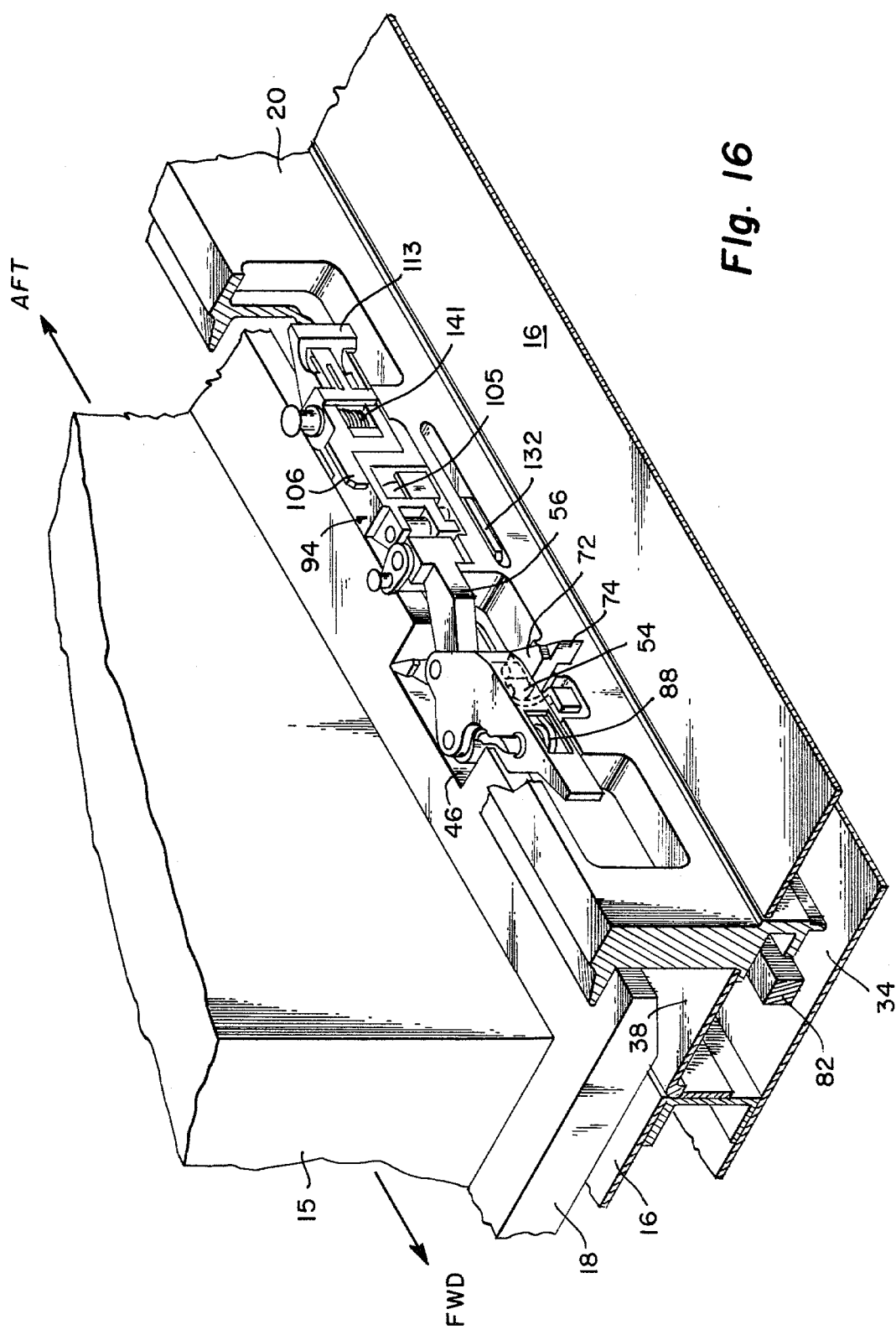

Now, if the drawbar 82 is moved to the right from the position shown in FIG. 12 to the "NO DROP" location, the lock assumes the positions illustrated in FIGS. 16 and 24. Cams 78 and 80 will engage cam surfaces on the drawbar 82 to cause shaft 76 to rotate in a clockwise direction, thereby moving locking member 74 into the broken-line position shown in FIG. 4 where upstanding portion 72 engages pin 70, thereby preventing the locking members 54 and 56 from moving outwardly. All locking members 74 must thereafter be rotated inwardly by the loadmaster after the drawbar is moved from the "NO DROP" position to permit local or remote release.

As will now be appreciated, each locking member 74 can be remotely locked but not unlocked by drawbar 82. In an aborted airdrop it is necessary that all members 74 be moved rapidly to their FIG. 24 locked positions from the loadmaster station adjacent control 23. In this condition it is important that a positive aft restraint exists in the event that the airplane goes into an accelerated climb after the abort. It is not necessary that unlocking be accomplished remotely because a minimum of several minutes would elapse between the abort and any second attempt to airdrop. During this period the loadmaster would be able to locally move the members 74 to their FIG. 22 unlocked position because, as normal procedure, he must inspect all locks immediately prior to the drop.

The details of the forward restraint mechanisms 30 (FIG. 2) are illustrated in FIG. 17. As was explained above, each pallet 18 is provided on its side opposite the rail 20 with indents 46, the same as the other side of the pallet. Projecting through an opening 140 in the rail 22 is a forward restraint element 131 which, as shown, is generally L-shaped in configuration and is keyed to a rotatable vertical shaft 142 extending through openings in the rail 22. The restraint element 31 has a portion 144 which can extend through the opening 140 and into the notch 46. Element 31 is normally biased toward and held in the position shown in FIG. 17 by a coil spring, not shown, which surrounds the shaft 142. Keyed to the bottom of the shaft 142 is a lever arm 146 which carries at its outer end a cam follower 148 adapted to engage a cam surface 150 on the right-hand drawbar 152. With the arrangement shown, and assuming that the drawbar 152 is in the position shown in FIG. 17, the coil spring around shaft 142 will normally urge portion 144 into the indent 46. This portion will restrain forward movement of the pallet; however, when the pallet moves aft, the edge of the notch 46 simply engages ramp 154 on portion 144 to force it out of the notch against the spring-bias tending to rotate it in a clockwise direction.

When loading pallets, the drawbar 152 is pushed forwardly whereby the ramp or cam surface 150 will force the lever arm 146 to rotate in a counterclockwise direction against the force of the aforesaid coil spring, thereby retracting portion 144 to a position where it is behind the opening 140. Pallets can now be pushed forwardly during a loading operation.

Referring to FIGS. 18 and 19, to prevent lever 106 from being inadvertantly returned to its disarmed position, a shoulder 180 may be formed along the underside of lever 106. A pivotal blocking member 182 is supported at its upper end from fuse housing 96 by a horizontal pivot (not shown) to swing to and from a blocking position in the path of movement of shoulder 180 along with lever 106. It is biased by a spring not shown toward the blocking position. When its lower end is depressed inwardly, member 182 is removed from the path of movement of shoulder 180 to permit lever 106 to swing freely. Member 182 prevents lever 106 from being swung back to the disarmed positioned until member 182 is again depressed inwardly.

Although the invention has been shown in connection with a certain specific embodiment, it will be readily apparent to those skilled in the art that various changes in form and arrangement of parts may be made to suit requirements without departing from the spirit and scope of the invention, which will be apparent from the appended claims.

The embodiments of the invention in which an exclusive property or privilege is claimed are defined as follows:

1. A cargo delivery system for aircraft, comprising: two spaced apart parallel rails adapted to support a cargo carrier for movement forward and aft parallel to the longitudinal axis of an aircraft, and at least two combination airdrop/logistics locks mounted by one of the rails to respectively engage the cargo carrier at two spaced apart locations for securing the carrier at a predetermined position along the rails, and for releasing the cargo carrier in unison upon attainment of a predetermined aft force applied to the cargo carrier by parachute means deployed behind the aircraft; each of said airdrop/logistics locks including a movable detent engageable with a cargo carrier and force responsive release means including;
   (a) an axially crushable force threshold element having a substantially constant resistance to deformation over a predetermined deformation range; and
   (b) movable deforming means acting between said element and said detent for deforming said element and for releasing said detent upon attainment of said predetermined aft force, said predetermined deformation range being sufficient to allow said element to be partially deformed without releasing said detent so as to permit aft shifting of the cargo carrier until the detent associated with a second such airdrop/logistics lock is engaged with the cargo carrier, with additional deformation of said element occuring upon attainment of said predetermined aft force.

2. The system of claim 1, including arming means operatively associated with said deforming means for disarming the lock by restraining said deforming means against movement to provide bidirectional pallet retention by said detent while positively engaged with a cargo carrier during logistics mode operation, and for arming the lock by releasing said deforming means to provide forward pallet retention and force responsive aft pallet retention by said detent while positively engaged with a pallet during airdrop mode operation, whereby one pallet or groups of pallets may be airdropped selectively by arming only the airdrop/logistics locks engaged with the pallet or pallets to be airdropped.

3. The system of claim 2, wherein said arming means include means for indicating that the lock is armed.

4. The system of claim 3, wherein said arming means include a member engagable with said deforming means at a disarmed position to restrain said deforming means against such movement, and movable to an armed position in which said member frees said deforming means for such movement, and stop means for preventing said member from returning to its disarmed position from its armed position.

5. The system of claim 1, wherein each airdrop/logistics lock further includes means operatively associated with said detent for retaining said detent in engagement with a cargo carrier whether the lock is armed or not armed.

6. The system of claim 5, including drawbar means operatively associated with all such airdrop/logistics locks for controlling the locks from a remote location by operating their detent restraining means to restrain all of said detents simultaneously.

7. The system of claim 6, wherein each lock includes means for locally operating the detent restraining means independently of said drawbar means.

8. The system of claim 7, wherein said drawbar means are further operative for controlling the locks by simultaneously releasing all of the detents.

9. The system of claim 1, wherein said rails are foldable between an upright position and a stowed position, said rails each including at least two rail sections which are independently positionable at their upright and stowed positions, said arming means being operative to selectively arm the locks associated with the rail in the upright position to effect airdrop of the pallets carried thereby.

10. The system of claim 1, including multiple forward restraint mechanisms mounted at intervals by the other of said rails, each of said mechanisms including restraint means for preventing movement of a cargo carrier in a forward direction while allowing movement of the cargo carrier in an aft direction.

11. The system of claim 10, wherein each of said restraint means include a ratchet element movable between an extended position in the path of movement of the cargo carrier and a retracted position removed therefrom, and wherein the system further includes drawbar means operatively associated with said ratchet elements for simultaneously positioning said ratchet elements at their retracted positions.

12. The system of claim 1, including an arming member movable to and from a closed position engaging said cartridge so as to prevent contraction thereof, whereby the lock is disarmed when said member is located in said closed position and is armed when said member is removed from said closed position.

13. The system of claim 12, including a shoulder carried by said member and latch means for selectively contacting said shoulder to prevent inadvertent return of said member to its closed position.

14. The system of claims 1, 12 or 13, wherein the detent is made up of two locking members pivotally connected together to form a scissors linkage in which one pair of ends thereof form spreadable detent surfaces insertable into an indent formed by a cargo carrier and the other pair of ends thereof act as pivotal support points with respect to which said one pair of ends is movable along a path extending through an opening formed in the one rail and generally transverse to the longitudinal axis of the aircraft, means acting between the support point associated with one of said locking members and said cartridge for transmitting an aft force applied to said one locking member by the cargo carrier to said cartridge, so as to cause said cartridge to contract as said one locking member moves along said path out of said indent responsive to said aft force.

15. The system of claim 14, wherein each lock further includes a lock-out member positionable in said path to block movement of said one locking member therealong out of said indent.

16. The system of claim 15, wherein said lock-out member also is positionable in said path to block movement of said one locking member therealong into said indent.

17. The system of claim 1 wherein said element is an axially crushable honeycomb slug and said movable deforming means includes a contractible cartridge, within which said slug is insertable to be crushed in resistance to release of the detent.

18. A cargo delivery system for aircraft adapted to transport at least one cargo carrier having multiple spaced-apart indents, the system comprising: means for supporting the cargo carrier for movement parallel to the longitudinal axis of an aircraft; first lock means for engaging one indent and second lock means for engaging a second indent spaced from said first indent to restrain the cargo carrier against aft movement; said first lock means and said second lock means resisting substantial aft movement of the cargo carrier until attainment of a predetermined aft force, while permitting slight aft shifting of the cargo carrier a distance sufficient to ensure thaft both said first lock means and said second lock means will be engaged with their respective indents without altering said predetermined aft force so that said lock means will share the aft force applied essentially equally to release the cargo carrier in unison upon attainment of the predetermined aft force.

19. The system of claim 18, including means for maintaining each of said lock means in restraining location with a cargo carrier even when said predetermined aft force is attained.

20. A lock for restraining a cargo carrier movable along a path, the lock comprising: a movable detent engageable with the cargo carrier and force responsive release means for releasing the detent from the cargo carrier in response to application of a predetermined force to the detent by the cargo carrier; wherein said force responsive release means includes (a) a deformable force threshold element having a substantially constant resistance to deformation over a predetermined deformation range, (b) movable deforming means acting between said element and said detent for deforming said element in relation to application of said force, and for releasing the detent when said element has been deformed essentially to the full extent of said predetermined deformation range, (c) arming means operatively associated with said deforming means for disarming the lock by restraining said deforming means against movement, and for arming the lock by releasing said deforming means, (d) said element being an axially crushable honeycomb slug, (e) said deforming means including a contractible cartridge within which said slug is insertable to be axially crushed in resistance to release of the detent, and (f) said arming means including a member movable to and from a closed position engaging said cartridge so as to prevent contraction thereof, whereby the lock is disarmed when said member is located in said closed position and is armed when said member is removed from said closed position.

21. The lock of claim 19, including a shoulder carried by said member and latch means for selectively contacting said shoulder to prevent inadvertant return of said member to its closed position.

22. The lock of claims 20 or 21, wherein the detent is made up of two locking members pivotally connected together to form a scissors linkage in which one pair of ends thereof form spreadable detent surfaces insertable into an indent formed by a cargo carrier and the other pair of ends thereof act as pivotal support points with respect to which said one pair of ends is movable along a path generally transverse to the path of movement of the cargo carrier, means acting between the support point associated with one of said locking members and said cartridge for transmitting a force applied to said one locking member by the cargo carrier to said cartridge, as to cause said cartridge to contract as said one locking member moves along said path out of said indent responsive to said aft force.

23. A method of aerial cargo delivery for use with two spaced apart parallel rails adapted to support a cargo carrier for movement forward and aft parallel to the longitudinal axis of an aircraft, and at least two combination airdrop/logistics locks mounted by one of the rails to respectively engage two spaced apart indents formed in the cargo carrier for securing the carrier at a predetermined position along the rails, and for releasing the carrier upon attainment of a predetermined aft force applied to the cargo carrier by parachute means deployed behind the aircraft; each of said airdrop/logistics locks including a movable detent engageable with a cargo carrier, the method comprising the steps of:

(a) providing each airdrop/logistics lock with a deformable force threshold element having a substantially constant resistance to deformation over a predetermined deformation range;

(b) inserting the detents of the two airdrop/logistics locks into the two cargo carrier indents, respectively;

(c) deforming each of said elements as resistance to aft movement of the cargo carrier in relation to application of aft force to the cargo carrier;

(d) shifting the cargo carrier in the aft direction when the inserted detent of only one airdrop/logistics lock is in force bearing engagement with the cargo carrier, while simultaneously therewith allowing the element associated with the one detent to be partially deformed an amount less than said predetermined deformation range, such aft shifting persisting until the inserted detent associated with the second airdrop/logistics lock is in force bearing engagement with the cargo carrier;

(e) maintaining both detents in force bearing engagement with the cargo carrier such that an aft force applied to the cargo carrier is shared essentially equally therebetween, and (f) releasing the detents of both airdrop/logistics locks in unision upon attainment of said predetermined aft force.

24. The method of claim 23, including disarming the lock by preventing any deformation of said element during logistics mode operation, and arming the lock by permitting deformation of said element during airdrop mode operation, whereby one pallet or groups of pallets may be airdropped selectively by arming only the locks engaged with the pallet or pallets to be airdropped.

25. The method of claim 24 including retaining the detent in engagement with a cargo carrier whether the lock is armed or not armed.

26. The method of claim 24, including indicating that the associated lock is armed.

27. The method of claim 23, including controlling the airdrop/logistics locks from a remote location.

28. The method of claim 27, including locally controlling the locks independently of such remote control.

29. The method of claim 27, including controlling the locks by simultaneously releasing all of their detents.

30. The method of claim 29, including maintaining each lock in restraining relation with a cargo carrier even when said predetermined aft force is attained.

31. A cargo delivery system for aircraft, comprising: two spaced apart parallel rails each made up of at least two rail sections independently movable between an upright position adapted to support a cargo carrier and a stowed position adjacent a floor surface; and a plurality of lock means respectively associated with the rail sections which make up one of said rails for restraining a cargo carrier supported thereby when their associated rail sections are in their upright positions, and means for remotely operating the lock means associated with only those rail sections which are located in their upright position; whereby one set of parallel rail sections may be in their upright positions for acceptance of cargo carrier borne cargo while another set of sections may be in their stowed positions for acceptance of another type of cargo.

* * * * *